United States Patent
Takamatsu et al.

(10) Patent No.: US 9,076,574 B2
(45) Date of Patent: Jul. 7, 2015

(54) ELASTOMER MATERIAL CONTAINING IMMOBILIZED IONIC COMPONENTS AND METHOD FOR MANUFACTURING THE SAME

(71) Applicant: TOKAI RUBBER INDUSTRIES, LTD., Aichi-ken (JP)

(72) Inventors: Shigeaki Takamatsu, Aichi-ken (JP); Shinji Kumagai, Aichi-ken (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 76 days.

(21) Appl. No.: 13/934,853

(22) Filed: Jul. 3, 2013

(65) Prior Publication Data

US 2013/0296478 A1 Nov. 7, 2013

Related U.S. Application Data

(63) Continuation of application No. PCT/JP2012/074703, filed on Sep. 26, 2012.

(30) Foreign Application Priority Data

Oct. 11, 2011 (JP) ................................. 2011-223959

(51) Int. Cl.
 *C08K 3/20* (2006.01)
 *H01B 3/44* (2006.01)
 (Continued)

(52) U.S. Cl.
 CPC ...... *H01B 3/447* (2013.01); *C08K 3/22* (2013.01); *C08L 101/02* (2013.01);
 (Continued)

(58) Field of Classification Search
 USPC ........................................ 524/560; 427/385.5
 See application file for complete search history.

(56) References Cited

U.S. PATENT DOCUMENTS

3,976,723 A * 8/1976 Williams et al. ............... 524/560
5,872,176 A * 2/1999 Hergenrother et al. ....... 524/494
(Continued)

FOREIGN PATENT DOCUMENTS

JP 6-264919 9/1994
JP 9-501009 1/1997
(Continued)

OTHER PUBLICATIONS

International Preliminary Report on Patentability and English language translation for PCT/JP2012/074703, mailed Apr. 15, 2014.
(Continued)

*Primary Examiner* — Satya Sastri
(74) *Attorney, Agent, or Firm* — Greenblum & Bernstein, P.L.C.

(57) ABSTRACT

An elastomer material containing immobilized ionic components includes an elastomer, ion-immobilized particles in which first ionic components are immobilized to metallic oxide particles, and second ionic components having electric charges opposite to electric charges of the first ionic components, wherein the ion-immobilized particles are chemically bonded to the elastomer. In the elastomer material, the first ionic components are immobilized to the elastomer through the metallic oxide particles. Therefore, the first ionic components do not easily migrate even with the passage of time or in use. Thus, the elastomer material is less susceptible to temporal changes in properties. The elastomer material is preferably used for the component of a transducer and a conductive roll.

7 Claims, 7 Drawing Sheets

(51) Int. Cl.
*C08K 3/22* (2006.01)
*C08L 101/02* (2006.01)
*H01B 19/04* (2006.01)
*C08L 101/10* (2006.01)
*C08L 21/00* (2006.01)
*C08K 5/00* (2006.01)

(52) U.S. Cl.
CPC .................. *C08K 2003/2241* (2013.01); *C08K 2003/2244* (2013.01); *H01B 19/04* (2013.01); *C08L 101/10* (2013.01); *C08K 5/0091* (2013.01); *C08L 21/00* (2013.01)

(56) References Cited

U.S. PATENT DOCUMENTS

| | | | | |
|---|---|---|---|---|
| 6,566,435 | B1* | 5/2003 | Teoh et al. | 524/432 |
| 7,611,782 | B2* | 11/2009 | Furuzono et al. | 428/701 |
| 7,771,521 | B2* | 8/2010 | Yamada et al. | 96/12 |
| 8,250,672 | B2* | 8/2012 | Lipinski et al. | 2/161.7 |
| 8,343,392 | B2* | 1/2013 | Zhang | 252/587 |
| 8,723,209 | B2* | 5/2014 | Xia et al. | 257/98 |
| 2003/0191222 | A1* | 10/2003 | Suzuki et al. | 524/430 |
| 2005/0228111 | A1* | 10/2005 | Furuzono et al. | 524/497 |
| 2007/0008675 | A1* | 1/2007 | Maliakal | 361/311 |
| 2007/0049678 | A1* | 3/2007 | Kim et al. | 524/430 |
| 2008/0207809 | A1 | 8/2008 | Koide | |
| 2008/0227913 | A1 | 9/2008 | Koide | |
| 2011/0300393 | A1 | 12/2011 | Iio et al. | |
| 2014/0300247 | A1* | 10/2014 | Takamatsu et al. | 310/300 |

FOREIGN PATENT DOCUMENTS

| | | |
|---|---|---|
| JP | 11-80377 | 3/1999 |
| JP | 2964821 | 8/1999 |
| JP | 11-335403 | 12/1999 |
| JP | 2001-524278 | 11/2001 |
| JP | 2003-506858 | 2/2003 |
| JP | 2005-51949 | 2/2005 |
| JP | 2008-81547 | 4/2008 |
| JP | 2010-59441 | 3/2010 |
| JP | 2010-77383 | 4/2010 |
| JP | 2011-84712 | 4/2011 |
| JP | 2011-148641 | 8/2011 |
| WO | 95/04356 | 2/1995 |
| WO | 98/35529 | 8/1998 |
| WO | 01/06579 | 1/2001 |

OTHER PUBLICATIONS

U.S. Appl. No. 13/934,965, to Shigeaki Takamatsu et al., filed Jul. 3, 2013.
International Search Report, mail date is Dec. 18, 2012.

* cited by examiner

ELASTOMER MATERIAL CONTAINING IMMOBILIZED IONIC COMPONENTS AND METHOD FOR MANUFACTURING THE SAME

CLAIM FOR PRIORITY

This application is a continuation of PCT/JP2012/074703 filed Sep. 26, 2012, and claims the priority benefit of Japanese Application No. 2011-223959, filed Oct. 11, 2011, the contents of which are expressly incorporated by reference in their entirety.

TECHNICAL FIELD

The present invention relates to an elastomer material containing ionic components, and in particular, to an elastomer material containing ionic components immobilized to an elastomer.

BACKGROUND ART

Transducers such as actuators and sensors that perform conversion between mechanical energy and electric energy and speakers and microphones that perform conversion between acoustic energy and electric energy are known. In order to form a highly flexible, compact, and lightweight transducer, polymer materials such as dielectric elastomers are useful.

For example, an actuator can be formed by arranging a pair of electrodes on both sides in the thickness direction of a dielectric layer formed of a dielectric elastomer. In actuators of this kind, when a voltage applied between the electrodes increases, an electrostatic attraction between the electrodes increases. The dielectric layer interposed between the electrodes is thereby compressed in the thickness direction, leading to a reduced thickness of the dielectric layer. When the film thickness decreases, the dielectric layer accordingly expands in a direction parallel to the electrode surfaces. On the other hand, when the voltage applied between the electrodes is reduced, the electrostatic attraction between the electrodes decreases. A compressive force against the dielectric layer in the thickness direction thereby decreases, and the film thickness increases due to the elastic restoring force of the dielectric layer. When the film thickness increases, the dielectric layer accordingly contracts in a direction parallel to the electrode surfaces. The actuator thus expands and contracts the dielectric layer, thereby driving a member to be driven.

A force and a displacement output from the actuator are determined by the magnitude of the applied voltage and the dielectric constant of the dielectric layer. In other words, the larger the applied voltage and the dielectric constant of the dielectric layer, the larger the generative force and displacement of the actuator. For this reason, materials for use in the dielectric layer include silicone rubber, which has high resistance to dielectric breakdown, and acrylic rubber, nitrile rubber, or the like, each having a high dielectric constant (see, for example, Patent Documents 1 and 2).

Patent Document 1: Publication of Japanese Translation of PCT Application No. 2003-506858
Patent Document 2: Publication of Japanese Translation of PCT Application No. 2001-524278
Patent Document 3: Japanese Patent Application Publication No. 2005-51949
Patent Document 4: Japanese Patent Application Publication No. 6-264919
Patent Document 5: Japanese Patent Application Publication No. 2011-148641

SUMMARY OF THE INVENTION

Problem to be Solved by the Invention

However, the dielectric constant of silicone rubber is low. Thus, when silicone rubber is used for the material of the dielectric layer, the electrostatic attraction with respect to the applied voltage is low, which makes it difficult to obtain a desired generative force and displacement. Silicone rubber does not have sufficient resistance to dielectric breakdown, so an applicable voltage is limited.

On the other hand, the dielectric constant of acrylic rubber and nitrile rubber is higher than that of silicone rubber. Thus, when acrylic rubber or the like is used for the material of the dielectric layer, the electrostatic attraction with respect to the applied voltage increases, compared to a case where silicone rubber is used. However, the electric resistance of acrylic rubber or the like is lower than that of silicone rubber. Therefore, the dielectric layer is more susceptible to dielectric breakdown. Because a current passes through the dielectric layer during voltage application (so-called a leakage current), electric charges are not prone to accumulate in the vicinity of the interface between the dielectric layer and the electrodes. Despite its high dielectric constant, therefore, the electrostatic attraction decreases, so a satisfactory force and displacement can not be obtained. Furthermore, there is a risk that when a current passes through the dielectric layer, the dielectric layer may be broken due to generated Joule's heat. Thus, it is difficult to achieve a dielectric layer providing excellent resistance to dielectric breakdown and a larger electrostatic attraction by the use of one material.

Electrophotographic apparatuses such as copiers, printers, and facsimiles include various conductive rolls such as charging rolls, developing rolls, and transfer rolls. Such a conductive roll includes, for example, as disclosed in Patent Document 4, a core metal, a conductive elastic layer provided on the outer periphery of the core metal, and a resistance regulating layer provided on the outer periphery of the conductive elastic layer. The resistance regulating layer has a function of regulating the electric resistance of the conductive roll and is formed of a composition in which ionic components are blended into resin or rubber.

In such a kind of conductive roll, when a voltage is applied thereto for a long period of time, the ionic components ooze out of the surface of the resistance regulating layer as bloom. There is another disadvantage that when the compatibility between the ionic components and a matrix such as rubber is low, the ionic components are likely to precipitate on the surface of the resistance regulating layer. When the ionic components ooze or precipitate, the resistance regulating layer is likely to exfoliates, and the electric resistance of the conductive roll changes, leading to the occurrence of defects such as a white patch in an image due to faulty charging.

The present invention has been achieved in view of the above circumstances, and objects thereof are to provide an elastomer material that can be used for the component of a transducer and a conductive roll and that is less prone to change in properties with time or the use thereof and a method for manufacturing the same.

Means for Solving the Problem (1) An elastomer material containing immobilized ionic components according to the present invention is characterized by including an elastomer, ion-immobilized particles in which first ionic components are immobilized to metallic oxide particles, and second ionic components having electric charges opposite to those of the first ionic components, in which the ion-immobilized particles are chemically bonded to the elastomer.

In the elastomer material containing immobilized ionic components according to the present invention (hereinafter, appropriately called "the elastomer material according to the present invention"), the ion-immobilized particles are chemically bonded to the elastomer. The ion-immobilized particles include metallic oxide particles and the first ionic components immobilized thereto. In other words, the first ionic components are immobilized to the elastomer through the metallic oxide particles.

The electric charges of the first ionic components immobilized to the metallic oxide particles may be positive or negative. For example, when the first ionic components having positive electric charges are immobilized, the elastomer material includes an elastomer, cation-immobilized particles that are chemically bonded to the elastomer and in which cations are immobilized to the metallic oxide particles, and the second ionic components having negative electric charges (anions). FIG. 1 illustrates a schematic view of the components of the elastomer material according to the present embodiment. As illustrated in FIG. 1, the elastomer material 2 includes an elastomer 20, cation-immobilized particles 21, and anions 22. The elastomer 20 includes carboxy groups (—COOH). The cation-immobilized particles 21 are formed by immobilizing cations 211 to $TiO_2$ particles 210. The cations 211 and the anions 22 are counter ions. The cation-immobilized particles 21 are chemically bonded to the elastomer 20 through the reaction of —COOH of the elastomer 20 and —OH of the $TiO_2$ particles 210.

In contrast, when the first ionic components having negative electric charges are immobilized, the elastomer material includes an elastomer, anion-immobilized particles that are chemically bonded to the elastomer and in which anions are immobilized to the metallic oxide particles, and cationic components having positive electric charges. FIG. 2 illustrates a schematic view of the components of the elastomer material according to the present embodiment. As illustrated in FIG. 2, the elastomer material 2 includes the elastomer 20, anion-immobilized particles 23, and cations 24. The elastomer 20 includes carboxy groups (—COOH). The anion-immobilized particles 23 are formed by immobilizing anions 231 to $TiO_2$ particles 230. The anions 231 and the cations 24 are counter ions. The anion-immobilized particles 23 are chemically bonded to the elastomer 20 through the reaction of —COOH of the elastomer 20 and —OH of the $TiO_2$ particles 230. FIG. 1 and FIG. 2 are schematic views for illustrating the elastomer material according to the present invention and do not limit the elastomer material according to the present invention at all.

In the elastomer material according to the present invention, one of the counter ions are immobilized to the elastomer through the metallic oxide particles. The immobilized ionic components do not easily migrate. Therefore, the ionic components are less likely to ooze or precipitate. Thus, for example, when the elastomer material according to the present invention is used for a resistance regulating layer of a conductive roll, the exfoliation of a resistance regulating layer and changes in electric resistance can be suppressed, thereby reducing defects in an image caused by faulty charging.

A transducer can be formed by stacking the elastomer material according to the present invention on a dielectric layer. In this case, in a transducer including a dielectric layer and a pair of electrodes arranged on both the front side and the back side of the dielectric layer, an ion-immobilized layer formed of the elastomer material according to the present invention may be interposed between the dielectric layer and the electrodes. The ion-immobilized layer may be arranged on both the front side and the back side of the dielectric layer so as to sandwich the dielectric layer or may be arranged on either one of the front side and the back side of the dielectric layer, provided that the electric charges of the first ion components of the ion-immobilized particles have the same polarity as that of the adjacent electrode. In other words, when the first ionic components have positive electric charges in the ion-immobilized layer, the ion-immobilized layer is arranged between a positive electrode and the dielectric layer. In contrast, when the first ionic components have negative electric charges, the ion-immobilized layer is arranged between a negative electrode and the dielectric layer.

Hereinafter, the structure and operation of a transducer according to an embodiment will be described with reference to schematic views. FIG. 3 is a schematic sectional view of a transducer before voltage application. FIG. 4 is a schematic sectional view of the transducer during voltage application.

As illustrated in FIG. 3, the transducer 1 includes a dielectric layer 10, a cation-immobilized layer 11, an anion-immobilized layer 12, a positive electrode 13, and a negative electrode 14. The cation-immobilized layer 11 is arranged on the upper side of the dielectric layer 10. The positive electrode 13 is arranged on the upper side of the cation-immobilized layer 11. In other words, the cation-immobilized layer 11 is interposed between the dielectric layer 10 and the positive electrode 13. The cation-immobilized layer 11 includes an elastomer 110, cation-immobilized particles 111, and anionic components 112. The cation-immobilized particles 111 are metallic oxide particles to which cationic components are immobilized. The cation-immobilized particles 111 are chemically bonded to the elastomer 110.

Similarly, the anion-immobilized layer 12 is arranged on the lower side of the dielectric layer 10. The negative electrode 14 is arranged on the lower side of the anion-immobilized layer 12. In other words, the anion-immobilized layer 12 is interposed between the dielectric layer 10 and the negative electrode 14. The anion-immobilized layer 12 includes an elastomer 120, anion-immobilized particles 121, and cationic components 122. The anion-immobilized particles 121 are metallic oxide particles to which anionic components are immobilized. The anion-immobilized particles 121 are chemically bonded to the elastomer 120. The cation-immobilized layer 11 and the anion-immobilized layer 12 are included in the elastomer material according to the present invention.

As illustrated in FIG. 4, when a voltage is applied between the positive electrode 13 and the negative electrode 14, the anionic components 112 in the cation-immobilized layer 11 migrate toward the positive electrode 13. Because the cation-immobilized particles 111 are bonded to the elastomer 110, the cationic components hardly migrate. Similarly, in the anion-immobilized layer 12, the cationic components 122 migrate toward the negative electrode 14. Because the anion-immobilized particles 121 are bonded to the elastomer 120, the anionic components hardly migrate. In the dielectric layer 10, negative electric charges and positive electric charges are accumulated in the vicinity of the interface with the cation-immobilized layer 11 and in the vicinity of the interface with the anion-immobilized layer 12, respectively, due to polarization. In the transducer 1, thus, a large number of electric charges are accumulated in the cation-immobilized layer 11, the anion-immobilized layer 12, and respective vicinities of the interface between the dielectric layer 10 and the cation-immobilized layer 11 and the interface between the dielectric layer 10 and the anion-immobilized layer 12. Therefore, a large electrostatic attraction is generated from the positive electrode 13 and the negative electrode 14 so as to compress the dielectric layer 10, the cation-immobilized layer 11, and the anion-immobilized layer 12. This allows the dielectric layer 10, the cation-immobilized layer 11, and the anion-immobilized layer 12 to be compressed in the up and down direction and expanded accordingly in the right and left direction as illustrated by the white arrow in FIG. 4.

When the electric resistance of the dielectric layer 10 is high, the accumulated electric charges do not easily migrate within the dielectric layer 10. Therefore, so-called leakage current is low, and Joule's heat due to the leakage current is less prone to be generated. In the cation-immobilized layer 11, the cationic components having the same polarity as that of the adjacent positive electrode 13 are immobilized to the elastomer 110 through the metallic oxide particles. Therefore, the cationic components do not easily migrate toward the dielectric layer 10 side (the side opposite from the positive electrode 13). Similarly, in the anion-immobilized layer 12, the anionic components having the same polarity as that of the adjacent negative electrode 14 are immobilized to the elastomer 120 through the metallic oxide particles. Therefore, the anionic components do not easily migrate toward the dielectric layer 10 side (the side opposite from the negative electrode 14). The ionic components are thus less likely to migrate from the cation-immobilized layer 11 and the anion-immobilized layer 12 toward the dielectric layer 10. The electric resistance of the dielectric layer 10 is therefore less prone to decrease. In other words, the dielectric layer 10 is less prone to deteriorate with time, and can maintain high resistance to dielectric breakdown.

As described above, by stacking the ion-immobilized layer formed of the elastomer material according to the present invention on the dielectric layer having high resistance to dielectric breakdown, a large electrostatic attraction can be generated. In the ion-immobilized layer, the first ionic components having electric charges of the same polarity as that of the adjacent electrode are immobilized to the elastomer through the metallic oxide particles. Thus, the ionic components within the ion-immobilized layer do not easily migrate toward the dielectric layer. Therefore, a large electrostatic attraction can be therefore generated, while maintaining the resistance to dielectric breakdown of the dielectric layer. The elastomer material according to the present invention can form a high-output transducer within a practical voltage range.

Patent Document 3 discloses an actuator in which a conductive polymer layer and an ionic electrolyte-containing layer are interposed between a pair of electrodes. In the actuator according to Patent Document 3, a voltage is applied to dope/undope the ions of the ionic electrolyte-containing layer to/from the conductive polymer layer, thereby expanding and contracting the conductive polymer layer to generate a force. The actuator according to Patent Document 3 is different from the transducer employing the elastomer material according to the present invention in that ions are allowed to migrate between the adjacent layers.

(2) A method for manufacturing an elastomer material containing immobilized ionic components according to the present invention (hereinafter, appropriately called "the method for manufacturing an elastomer material according to the present invention") is characterized by including: a chelating process of adding a chelating agent to an organometallic compound to produce a chelate compound of the organometallic compound; an ion immobilizing process of adding a reactive ionic liquid, an organic solvent, and water to the chelate compound of the organometallic compound, immobilizing first ionic components in the reactive ionic liquid to metallic oxide particles produced by hydrolytic reaction of the organometallic compound to produce ion-immobilized particles, and obtaining a sol containing the ion-immobilized particles and second ionic components in the reactive ionic liquid; and a curing process of mixing the sol and a polymer solution containing a rubber polymer having a functional group that can react with hydroxy group to prepare a mixed solution, and applying the mixed solution onto a substrate to be cured.

The method for manufacturing an elastomer material according to the present invention includes the chelating process, the ion immobilizing process, and the curing process. In the chelating process, an organometallic compound is chelated. The organometallic compound is hydrolyzed by reaction with water and undergoes polycondensation (a sol-gel reaction). By chelating the organometallic compound in advance, a rapid reaction of the organometallic compound and water is suppressed in the next process, thereby allowing metallic oxide particles having a small particle diameter to be manufactured without being agglomerated.

Subsequently, in the ion immobilizing process, the reactive ionic liquid, a predetermined organic solvent, and water are added to the chelate compound of the organometallic compound. The hydrolytic reaction of the organometallic compound thereby proceeds to produce metallic oxide particles, and the produced metallic oxide particles react with the first ionic components in the reactive ionic liquid, allowing the first ionic components to be immobilized to the metallic oxide particles. In the present process, a reaction with the reactive ionic liquid proceeds concurrently with the hydrolytic reaction of the organometallic compound. This allows the first ionic components in the reactive ionic liquid to be immobilized not only to the surfaces of the produced metallic oxide particles but also to the inside thereof. In this regard, this process is different from conventional methods by which ionic components are immobilized to only the surfaces of the particles. Through the chelating process and the ion immobilizing process, a sol containing the ion-immobilized particles and the second ionic components is obtained.

Subsequently, in the curing process, the obtained sol and the polymer solution containing the rubber polymer are mixed to manufacture an elastomer material from the obtained mixed solution. The ion-immobilized particles (metallic oxide particles) in the sol contain hydroxy groups (—OH). On the other hand, the rubber polymer contains functional groups that can react with the hydroxy groups. At the time of curing of the mixed solution, therefore, the hydroxy groups react with the functional groups, so that the ion-immobilized particles and the rubber polymer are chemically bonded to each other. With the manufacturing method according to the present invention, the elastomer material according to the present invention can be manufactured relatively easily.

DESCRIPTION OF THE REFERENCE NUMERALS

Figure 1:
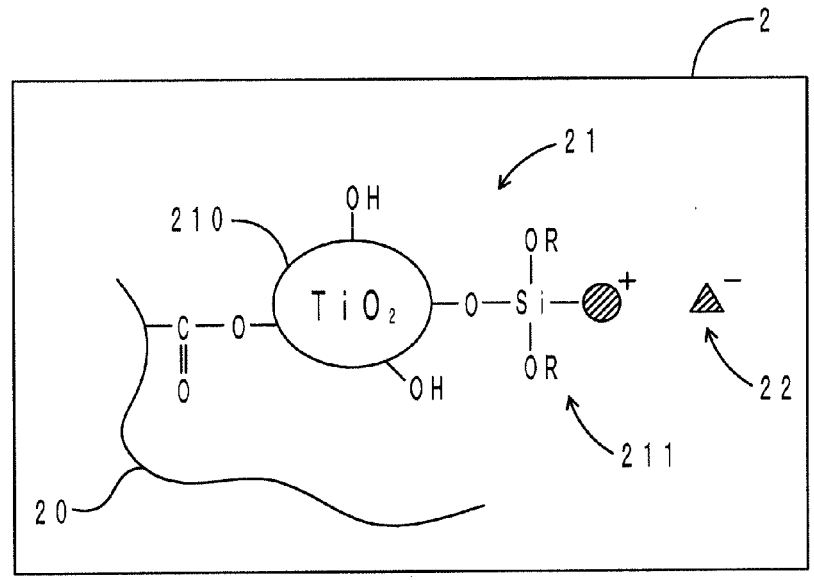
FIG. 1 is a schematic view of the components of an elastomer material.
Figure 2:
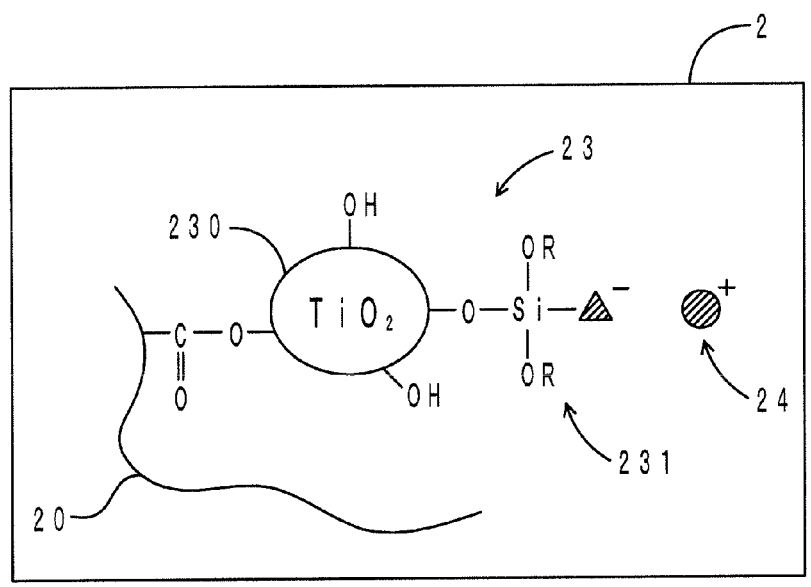
FIG. 2 is a schematic view of the components of an elastomer material.
Figure 3:
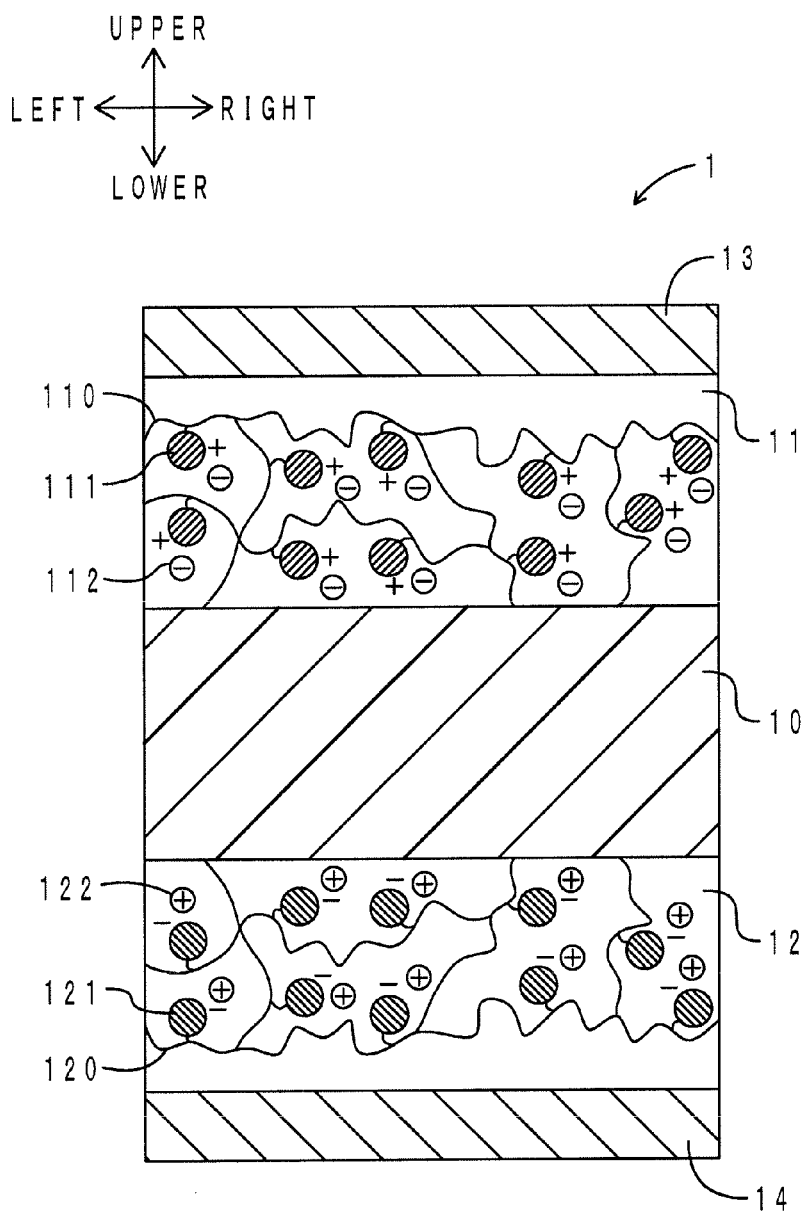
FIG. 3 is a schematic sectional view of a transducer before voltage application.
Figure 4:
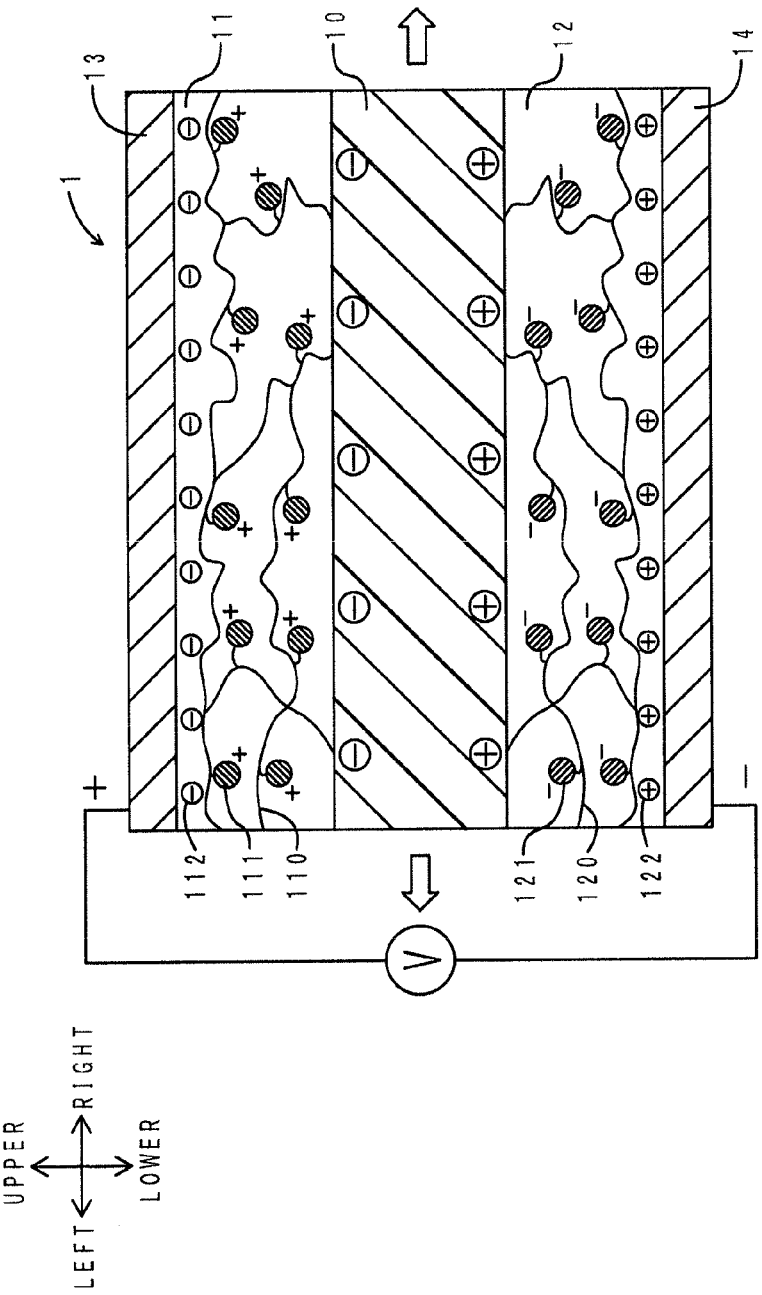
FIG. 4 is a schematic sectional view of the transducer during voltage application.

1: Transducer, 10: Dielectric layer, 11: Cation-immobilized layer, 12: Anion-immobilized layer, 13: Positive electrode, 14: Negative electrode, 110: Elastomer, 111: Cation-immobilized particle, 112: Anionic component, 120: Elastomer, 121: Anion-immobilized particle, 122: Cationic component.

2: Elastomer material, 20: Elastomer, 21: Cation-immobilized particle, 22: Anion, 23: Anion-immobilized particle, 24: Cation, 210: $TiO_2$ particle, 211: Cation, 230: $TiO_2$ particle, 231: Anion.

5: Actuator, 50: Dielectric layer, 51a, 51b: Electrodes, 52: Upper chuck, 53: Lower chuck, 500: Dielectric layer, 501: Cation-immobilized layer, 502: Anion-immobilized layer.

MODES FOR CARRYING OUT THE INVENTION

Hereinafter, embodiments of an elastomer material and a method for manufacturing the same according to the present invention will be described. The elastomer material and the method for manufacturing the same according to the present invention are not limited to the following embodiments and may be embodied in various ways in which modifications, improvements, etc. that could be performed by those skilled in the art are performed without departing from the scope of the present invention.

<Elastomer Material Containing Immobilized Ionic Components>

The elastomer material according to the present invention includes an elastomer, ion-immobilized particles, and second ionic components.

The elastomer is not particularly limited as long as it is capable of being chemically bonded to the ion-immobilized particles. As will be described later, when the ion-immobilized particles have a hydroxy group (—OH), an elastomer having a functional group that can react with the hydroxy group may be used. Examples of such a functional group include a carboxy group (—COOH), an amino group (—NH), and an epoxy group. For example, in view of high dielectric constant, preferable examples include carboxy group-modified nitrile rubber (X-NBR) and carboxy group-modified hydrogenated nitrile rubber (XH-NBR). Among them, an elastomer having an acrylonitrile content (combined AN amount) of 33% by mass or more is preferable. The combined AN amount is the mass ratio of acrylonitrile when the entire rubber mass is 100% by mass.

The ion-immobilized particles are formed by immobilizing the first ionic components to the metallic oxide particles. The metallic oxide particles, in view of being high in insulating properties, preferably contain at least one element of titanium and zirconium. Examples of the metallic oxide particles include oxide particles such as titanium dioxide ($TiO_2$) and zirconium dioxide ($ZrO_2$) each in isolation and complex particles such as $TiO_2/ZrO_2$ and $TiO_2/ZrO_2/SiO_2$. As will be described later, the metallic oxide particles are preferably manufactured by the hydrolytic reaction of an organometallic compound (the sol-gel process). According to the sol-gel process, —OH groups are likely to remain on the surfaces of the produced metallic oxide particles. For this reason, the method is advantageous for the chemical bond with the elastomer compared to metallic oxide particles manufactured by the dry method disclosed in, for example, Patent Document 5. The agglomeration of the ion-immobilized particles is suppressed by being chemically bonded to the elastomer.

In view of the resistance to dielectric breakdown of the elastomer material, the ion-immobilized particles are preferably dispersed in the elastomer as uniformly as possible. The particle diameter of the ion-immobilized particles is preferably as small as possible. In view of these circumstances, the median diameter of the metallic oxide particles constituting the ion-immobilized particles is preferably 5 nm or more and 100 nm or less. The median diameter is more preferably 30 nm or less, and in particular, about 8 nm to 20 nm. The particle diameter of the metallic oxide particles can be measured through observation using a transmission electron microscope (TEM). The particle diameter may also be measured by the small-angle X-ray scattering method.

When the metallic oxide particles are manufactured by the hydrolytic reaction of an organometallic compound, it is estimated that the particle diameter of the metallic oxide particles in a sol and the particle diameter of the metallic oxide particles in the elastomer material become equal. The particle diameter of the metallic oxide particles in the sol may be therefore employed as the particle diameter of the metallic oxide particles in the elastomer material. The particle diameter of the metallic oxide particles in the sol can be measured by using, for example, a laser diffraction/scattering particle diameter/particle size distribution measuring apparatus manufactured by Nikkiso Co., Ltd. Also, when the sol is dried, the particle diameter of the metallic oxide particles can be measured through observation using a scanning electron microscope (SEM).

The content of the ion-immobilized particles in the elastomer material may be appropriately determined so as to satisfy the characteristics required depending on use. For example, when the elastomer material is used as the component of a transducer, the content of the ion-immobilized particles is preferably 1 part by mass or more and 10 parts by mass or less with respect to 100 parts by mass of the elastomer. This is because when the content of the ion-immobilized particles is less than 1 part by mass, the effect of increasing an electrostatic attraction is poor. This is also because when the content of the ion-immobilized particles exceeds 10 parts by mass, the effect of increasing the electrostatic attraction is saturated, which increases the amount of so-called leakage current.

The first ionic components constituting the ion-immobilized particles are the counter ions of the second ionic components. The ion-immobilized particles can be synthesized by, for example, causing a reactive ionic liquid containing the first ionic components before immobilization and the second ionic components to react with the metallic oxide particles obtained by the sol-gel method. The detail will be described in the method for manufacturing an elastomer material according to the present invention.

<Method for Manufacturing an Elastomer Material Containing Immobilized Ionic Components>

The method for manufacturing an elastomer material according to the present invention includes a chelating process, an ion immobilizing process, and a curing process. Hereinafter, each process will be described in order.

[Chelating Process]

The present process is a process in which the chelating agent is added to the organometallic compound to produce a chelate compound of the organometallic compound. When a sol of complex particles such as $TiO_2/ZrO_2$ is manufactured, an organometallic compound serving as the raw material of one metallic oxide compound constituting the complex particles is chelated in the present process, and in the following ion immobilizing process, an organometallic compound serving as the raw material of the other metallic oxide compounds may be added to the chelate compound.

The organometallic compound may be appropriately selected from metal alkoxide compounds and metal acylate compounds depending on the type of desired metallic oxide particles. Examples of the metal alkoxide compound include tetra-n-butoxy titanium, tetra-n-butoxy zirconium, tetra-i-propoxy titanium, tetrakis(2-ethylhexyloxy) titanium, and titanium butoxide dimer. Examples of the metal acylate compound include polyhydroxy titanium stearate and zirconium tributoxy monostearate.

Examples of a chelating agent include β-diketone such as acetylacetone, benzoyl acetone, and dibenzoylmethane, β-keto acid ester such as ethyl acetoacetate and ethyl benzoylacetate, triethanolamine, lactic acid, 2-ethylhexane-1,3-diol, and 1,3-hexanediol. The chelating agent is preferably the same as a solvent for dissolving the rubber polymer in the curing process.

[Ion Immobilizing Process]

The present process is a process in which the reactive ionic liquid, the organic solvent, and water are added to the produced chelate compound of the organometallic compound, the first ionic components in the reactive ionic liquid are immobilized to the metallic oxide particles produced by the hydrolytic reaction of the organometallic compound to produce the ion-immobilized particles, and the sol containing the ion-immobilized particles and the second ionic components in the reactive ionic liquid is obtained.

The first ionic components contained in the reactive ionic liquid include a reactive group that can react with the hydroxy group (—OH) of the produced metallic oxide particles. Examples of the reactive group include an alkoxysilyl group (—Si(OR)$_3$: R is an alkyl group). Examples of the reactive ionic liquid containing such first ionic components are illustrated by Formulae (1) and (2) below. In the reactive ionic liquid of Formula (1), the cation is the first ionic component, while the anion is the second ionic component. In the reactive ionic liquid of Formula (2), the cation is the second ionic component, while the anion is the first ionic component.

(Formula (1))

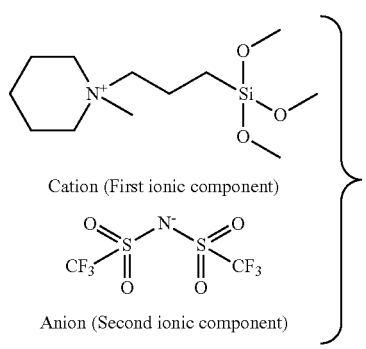

(Formula (2))

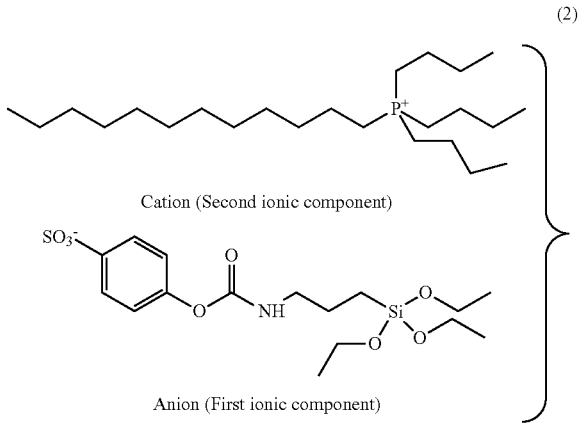

Figure 5:
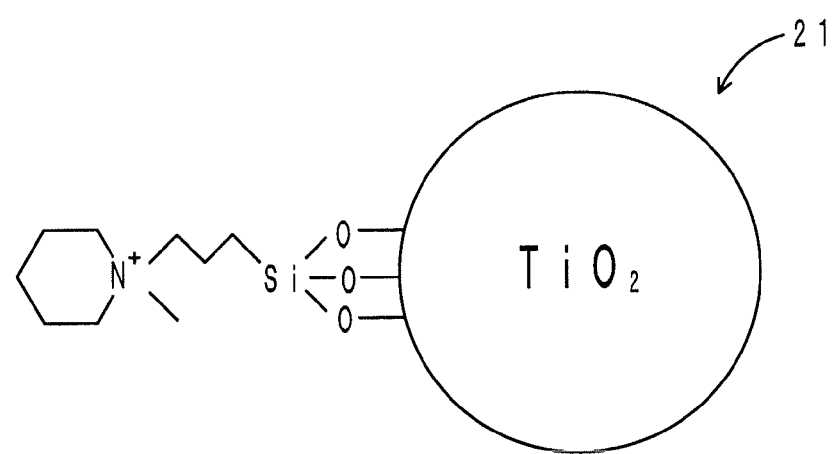
FIG. 5 is a schematic view of a cation-immobilized particle.

For example, in the present process, when titanium dioxide (TiO$_2$) is produced as the metallic oxide particles, upon reaction of TiO$_2$ with the reactive ionic liquid of Formula (1), cation-immobilized particles in which cations in Formula (1) are immobilized to TiO$_2$ are produced. A schematic view of the cation-immobilized particles produced in this case is illustrated in FIG. 5 (see FIG. 1 for the reference numeral). In the cation-immobilized particles 231, the cations (the first ionic components) may be chemically bonded to the surface of TiO$_2$ (the metallic oxide particles) or may be chemically bonded to the inside thereof.

For the organic solvent, alcohols such as methanol, ethanol, and isopropyl alcohol (IPA), ketones such as methyl ethyl ketone (MEK) and methyl isobutyl ketone (MIBK), and ethers such as tetrahydrofuran (THF) may be used. For example, addition of IPA improves the affinity between the chelate compound and water, so that nuclei of metallic oxide particles are more likely to be produced. Addition of MEK can improve the compatibility between the sol containing ion-immobilized particles and a solution dissolving the rubber polymer when the elastomer material is manufactured. Depending on the type and additive amount of an organic solvent used, the particle diameter of the metallic oxide particles to be produced varies. For example, when metallic oxide particles having a median diameter of about 10 nm to 20 nm are produced, IPA and MEK may be added with the number of moles of IPA/the number of moles of MEK being about 0.6, and the additive amount of IPA may be seven to ten times the number of moles of the used organometallic compound. Water may be added in an amount required for the hydrolysis of the organometallic compound.

Through the chelating process and the ion immobilizing process, the sol containing the ion-immobilized particles and the second ionic components is obtained. The obtained sol may be used for the subsequent curing process as it is. However, the obtained sol is preferably used for the curing process after subjected to aging treatment. The aging treatment may be performed by leaving the sol at rest for a few hours under a temperature of about 40° C. The aging treatment can reduce the number of hydroxy groups remaining within the metallic oxide particles, thereby suppressing the agglomeration of the ion-immobilized particles in the sol under storage.

[Curing Process]

The present process is a process in which the obtained sol and the polymer solution containing the rubber polymer having the functional groups that can react with hydroxy groups are mixed to prepare a mixed solution, and the mixed solution is applied onto a substrate to be cured.

The polymer solution may be prepared by dissolving a pre-crosslinking polymer of the elastomer in a solvent. As described above, the solvent used is preferably the same as the chelating agent used in chelating the organometallic compound. The blend amount of the sol may be appropriately determined in accordance with the amount of the ion-immobilized particles to be contained in the elastomer. The mixed solution may be blended with other components such as cross-linking agents as needed. In this case, the other components may be blended in the polymer solution in advance.

For the curing of the mixed solution, the coated film formed on the substrate may be heated. By heat application, the rubber polymer undergoes crosslinking, and the hydroxy groups on the surfaces of the ion-immobilized particles react with the functional groups of the rubber polymer, thereby allowing the ion-immobilized particles to be chemically bonded to the elastomer. A method for applying the mixed solution is not in particularly limited. Examples of the method include printing methods such as inkjet printing, flexographic printing, gravure printing, screen printing, pad printing, and lithography, the dip method, the spray method, and the bar-coating method. The curing temperature of the coated film may be appropriately determined by taking into account the type of the solvent used and a reaction rate. For example, it is preferably set to the boiling point of the solvent or above.

EXAMPLES

Subsequently, the present invention will be described more specifically with reference to the examples.

<Manufacture of Actuator>

[Dielectric Layer]

A dielectric layer was produced as described below. First, 100 parts by mass of carboxy group-modified hydrogenated nitrile rubber ("Therban (trademark) XT8889" manufactured by LANXESS) and 10 parts by mass of silica ("Aerosil (trademark) 380" manufactured by Nippon Aerosil Co., Ltd.) were mixed and kneaded by a roll mill. Subsequently, the kneaded material was dissolved in acetylacetone. Then, 15 parts by mass of tetrakis(2-ethylhexyloxy) titanium as an organometallic compound was added to this solution to prepare a liquid elastomer composition. The solid content concentration of the prepared elastomer composition was 12% by mass. The acetylacetone here serves as a solvent for dissolving the carboxy group-modified hydrogenated nitrile rubber and also serves as a chelating agent for tetrakis(2-ethylhexyloxy) titanium. Then, the elastomer composition was applied onto a substrate and dried, and then, heated at 150° C. for about 60 minutes to obtain the dielectric layer. The thickness of the dielectric layer was about 20 µm, and the volume resistivity thereof was $2 \times 10^{12}$ Ω·cm.

(2) Cation-Immobilized Layer

A cation-immobilized layer was produced as described below. First, 0.02 mol of acetylacetone was added to 0.01 mol of tetra-i-propoxy titanium as an organometallic compound to be chelated. Subsequently, 0.002 mol of the reactive ionic liquid of Formula (1), 5 ml (0.083 mol) of isopropyl alcohol (IPA), 10 ml (0.139 mol) of methyl ethyl ketone (MEK), and 0.04 mol of water were added to the obtained chelate compound to obtain a sol containing $TiO_2$ particles to which cations are immobilized (cation-immobilized particles) and anions. The obtained sol was left at rest for two hours under a temperature of 40° C. to perform aging treatment. The median diameter of the $TiO_2$ particles within the sol was 8 nm.

Subsequently, 20 parts by mass of the sol after aging and 100 parts by mass of an acetylacetone solution of carboxy group-modified hydrogenated nitrile rubber (containing silica) that was used for the production of the dielectric layer were mixed, and 3 parts by mass of an acetylacetone solution of tetrakis(2-ethylhexyloxy) titanium (a concentration of 20% by mass) as a crosslinking agent was further added thereto to prepare a mixed solution. The prepared mixed solution was applied onto a substrate and dried, and then, heated at 150° C. for about 60 minutes to obtain the cation-immobilized layer. The film thickness of the cation-immobilized layer was about 10 µm, and the content of the cation-immobilized particles was 6.6 parts by mass. The volume resistivity of the cation-immobilized layer was $9 \times 10^{11}$ Ω·cm. The produced anion-immobilized layer is included in the elastomer material according to the present invention.

[Anion-Immobilized Layer]

An anion-immobilized layer was produced in the same manner as the cation-immobilized layer except that the type of the reactive ionic liquid was changed to be that of Formula (2). A sol obtained in the production process contains $TiO_2$ particles to which anions are immobilized (anion-immobilized particles) and cations. The median diameter of the $TiO_2$ particles in the sol was 10 nm. The volume resistivity of the anion-immobilized layer was $2 \times 10^{11}$ Ω·cm. The produced anion-immobilized layer is included in the elastomer material according to the present invention.

[Actuator of Example 1]

The cation-immobilized layer was bonded onto the front side of the dielectric layer, while the anion-immobilized layer was bonded onto the back side of the dielectric layer. The substrates were removed from the respective layers to produce a three-layer-structured dielectric layer. Carbon black was mixed into an acrylic rubber polymer solution and dispersed therein to prepare a conductive coating. The conductive coating was screen-printed onto both the front side and the back side of the produced three-layer-structured dielectric layer to provide electrodes. The actuator of Example 1 was thus manufactured.

[Actuator of Example 2]

A two-layer-structured dielectric layer was manufactured by bonding the cation-immobilized layer onto only the front side of the dielectric layer and removing the substrate. The same conductive coating as Example 1 was screen-printed onto both the front side and the back side of the produced two-layer-structured dielectric layer to provide electrodes. The actuator of Example 2 was thus manufactured.

[Actuator of Comparative Example 1]

An actuator was manufactured without employing the cation-immobilized layer and the anion-immobilized layer. In other words, the same conductive coating as Example 1 was directly screen-printed onto both the front side and the back side of the dielectric layer to provide electrodes. The actuator of Comparative Example 1 was thus manufactured.

<Evaluation>

Figure 6:
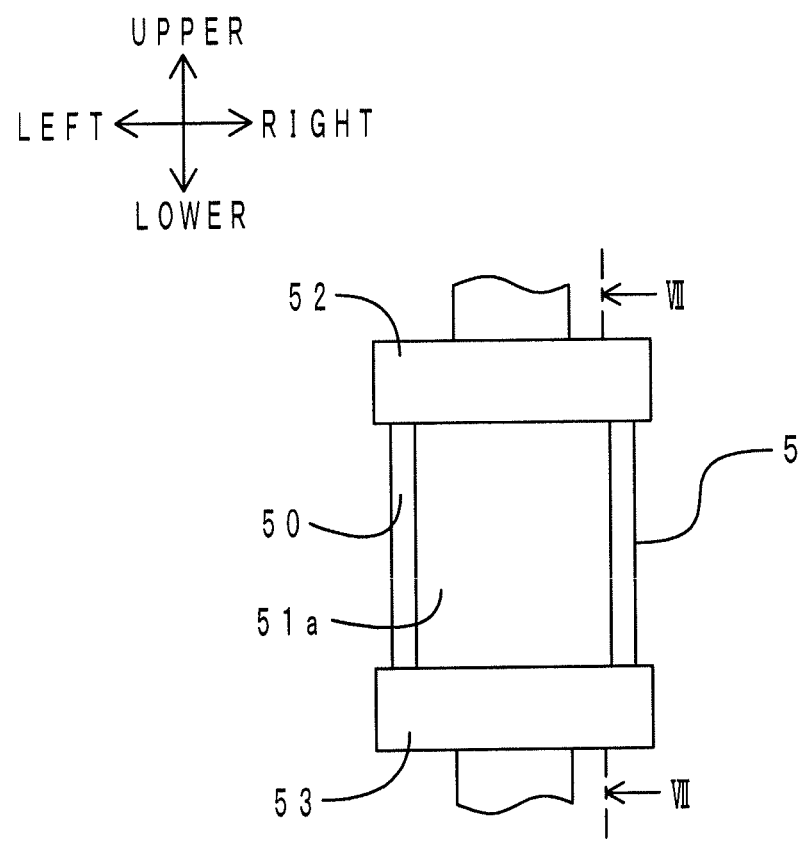
FIG. 6 is a front-side elevation view of an actuator of Example 1 mounted on a measuring apparatus.
Figure 7:
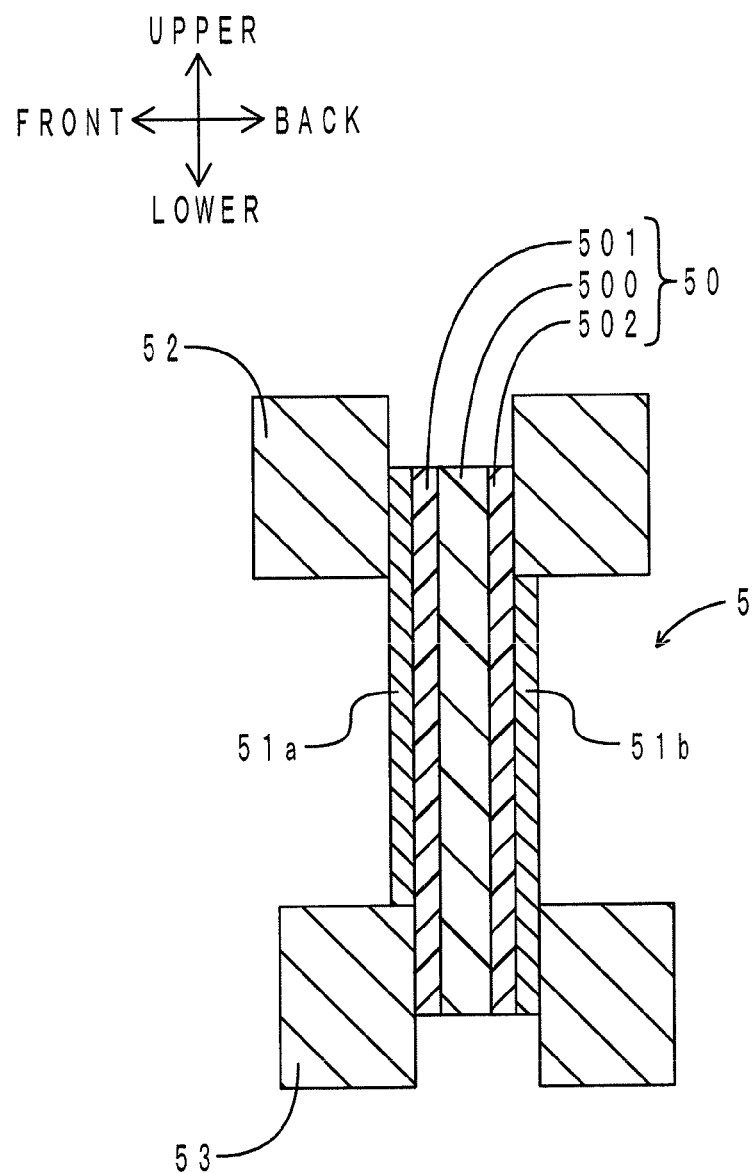
FIG. 7 is a VII-VII sectional view of FIG. 6.

For the produced three types of actuators, a generative force with respect to an applied voltage was measured. A measuring apparatus and a measuring method will be described. FIG. 6 illustrates a front-side elevation view of the actuator of Example 1 mounted on a measuring apparatus. FIG. 7 illustrates a VII-VII sectional view of FIG. 6.

As illustrated in FIG. 6 and FIG. 7, the upper end of an actuator 5 is held by an upper chuck 52 of the measuring apparatus. The lower end of the actuator 5 is held by a lower chuck 53. The actuator 5 is arranged between the upper chuck 52 and the lower chuck 53 while being extended in advance in the up and down direction (an elongation ratio of 25%). A load cell (not shown) is arranged over the upper chuck 52.

The actuator 5 includes a dielectric layer 50 and a pair of electrodes 51a, 51b. The dielectric layer 50 has a rectangular plate shape that is 50 mm long, 25 mm wide, and about 40 μm thick in a natural state. The dielectric layer 50 includes a dielectric layer 500, a cation-immobilized layer 501, and an anion-immobilized layer 502. The cation-immobilized layer 501 is arranged so as to cover the entire front side of the dielectric layer 500. Similarly, the anion-immobilized layer 502 is arranged so as to cover the entire back side of the dielectric layer 500. The electrodes 51a, 51b are arranged so as to face each other in the front and back direction across the dielectric layer 50. Each of the electrodes 51a, 51b has a rectangular plate shape that is 40 mm long, 25 mm wide, and about 10 μm thick in a natural state. The electrodes 51a, 51b are arranged so as to be displaced from each other by 10 mm in the up and down direction. In other words, the electrodes 51a, 51b overlap, via the dielectric layer 50, in a range of 30 mm long and 25 mm wide. An electric wire (not shown) is connected to the lower end of the electrode 51a. Similarly, an electric wire (not shown) is connected to the upper end of the electrode 51b. The electrodes 51a, 51b are connected to a power source (not shown) through the respective electric wires. During voltage application, the electrode 51a is the positive pole, while the electrode 51b is the negative pole.

When a voltage is applied between the electrodes 51a, 51b, an electrostatic attraction occurs between the electrodes 51a, 51b to compress the dielectric layer 50. The dielectric layer 50 thereby decreases in thickness and expands in the extension direction (the up and down direction). Through the expansion of the dielectric layer 50, the extension force in the up and down direction decreases. A decrease in the extension force during voltage application was measured using the load cell and was regarded as a generative force.

Figure 8:
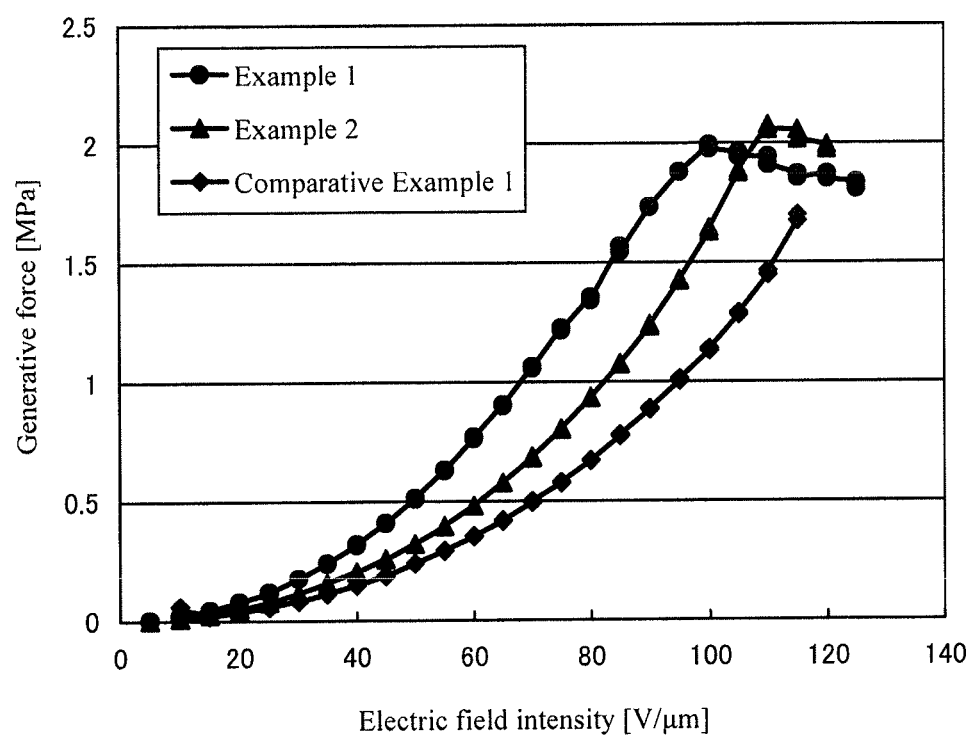
FIG. 8 is a graph illustrating the relationship between the electric field intensity and the generative force in the actuators of Examples and Comparative Example.

The measurement results will be described. FIG. 8 illustrates the relationship between the electric field intensity and the generative force for each actuator. In FIG. 8, the electric field intensity on the horizontal axis shows values obtained by dividing the applied voltage by the thickness of the dielectric layer. As illustrated in FIG. 8, when compared at the same electric field intensity, the actuators of Examples 1 and 2 gave a larger generative force than the actuator of Comparative Example 1. In particular, the actuator of Example 1 having the three-layer structure gave a large generative force as well as a high applicable voltage. It has been thus confirmed that by stacking the ion-immobilized layers formed of the elastomer material according to the present invention on the dielectric layer having high resistance to dielectric breakdown, higher output can be obtained.

INDUSTRIAL APPLICABILITY

The elastomer material according to the present invention is useful for the component of a transducer, in particular, a flexible actuator that is used in: an artificial muscle for use in industrial, medical and welfare robots and power-assisted suits and the like; a small-sized pump for use in cooling electronic components, for medical use, and the like and medical instruments and the like. It is also suitable for, for example, the component of a conductive roll for use in electrophotographic apparatuses, a resin antistatic film and container, and a solid electrolyte of lithium ion batteries or the like.

The invention claimed is:

1. An elastomer material containing immobilized ionic components, characterized by comprising:
    an elastomer;
    ion-immobilized particles in which first ionic components are immobilized to metallic oxide particles having a median diameter of 5 nm or more and 100 nm or less; and
    second ionic components having electric charges opposite to electric charges of the first ionic components, wherein the ion-immobilized particles are chemically bonded to the elastomer.

2. The elastomer material containing immobilized ionic components according to claim 1, wherein the ion-immobilized particles are synthesized by causing a reactive ionic liquid containing the first ionic components before immobilization and the second ionic components to react with the metallic oxide particles obtained by hydrolytic reaction of an organometallic compound.

3. The elastomer material containing immobilized ionic components according to claim 2, wherein the first ionic components contained in the reactive ionic liquid include an alkoxysilyl group, and the first ionic components are immobilized by reaction between the alkoxysilyl group and a hydroxy group of the metallic oxide particles.

4. The elastomer material containing immobilized ionic components according to claim 1, wherein the ion-immobilized particles include a hydroxy group, and the elastomer includes a functional group that optionally reacts with the hydroxy group.

5. The elastomer material containing immobilized ionic components according to claim 1, wherein the metallic oxide particles contain at least one element of titanium and zirconium.

6. The elastomer material containing immobilized ionic components according to claim 1, wherein the content of the ion-immobilized particles is 1 part by mass or more and 10 parts by mass or less with respect to 100 parts by mass of the elastomer.

7. A method for manufacturing an elastomer material containing immobilized ionic components, characterized by comprising:
    a chelating process of adding a chelating agent to an organometallic compound to produce a chelate compound of the organometallic compound;
    an ion immobilizing process of adding a reactive ionic liquid, an organic solvent, and water to the chelate compound of the organometallic compound, immobilizing first ionic components in the reactive ionic liquid to metallic oxide particles produced by hydrolytic reaction of the organometallic compound to produce ion-immobilized particles, and obtaining a sol containing the ion-immobilized particles and second ionic components in the reactive ionic liquid; and
    a curing process of mixing the sol and a polymer solution containing a rubber polymer having a functional group that optionally reacts with a hydroxy group to prepare a mixed solution and applying the mixed solution onto a substrate to be cured.

* * * * *